(12) United States Patent
Pavlovsky et al.

(10) Patent No.: US 9,627,971 B2
(45) Date of Patent: Apr. 18, 2017

(54) GATE DRIVER INITIATED ZERO VOLTAGE SWITCH TURN ON

(71) Applicant: Infineon Technologies Austria AG, Villach (AT)

(72) Inventors: Martin Pavlovsky, Munich (DE); Heiko Rettinger, Munich (DE)

(73) Assignee: Infineon Technologies Austria AG, Villach (AT)

( * ) Notice: Subject to any disclaimer, the term of this patent is extended or adjusted under 35 U.S.C. 154(b) by 140 days.

(21) Appl. No.: 14/573,750

(22) Filed: Dec. 17, 2014

(65) Prior Publication Data

US 2016/0181919 A1 Jun. 23, 2016

(51) Int. Cl.
*H02M 1/32* (2007.01)
*H02M 3/158* (2006.01)
*H02M 1/00* (2006.01)

(52) U.S. Cl.
CPC ............ *H02M 3/158* (2013.01); *H02M 1/32* (2013.01); *H02M 2001/0058* (2013.01); *Y02B 70/1491* (2013.01)

(58) Field of Classification Search
CPC . H02M 3/158; H02M 1/32; H02M 2001/0058
USPC ........................................................ 323/235
See application file for complete search history.

(56) References Cited

U.S. PATENT DOCUMENTS

| | | | | |
|---|---|---|---|---|
| 5,477,131 A * | 12/1995 | Gegner | ................ | H02M 3/158 323/222 |
| 5,594,635 A * | 1/1997 | Gegner | ................ | H02M 3/158 363/124 |
| 6,525,513 B1 * | 2/2003 | Zhao | ................ | H02M 3/158 323/222 |
| 6,580,255 B1 | 6/2003 | Wittenbreder, Jr. | | |
| 7,714,548 B1 | 5/2010 | Wittenbreder, Jr. | | |
| 8,278,896 B2 * | 10/2012 | Horii | ................ | H02M 3/158 323/271 |
| 8,625,311 B2 * | 1/2014 | Hosotani | ............ | H02M 3/3376 323/284 |
| 9,030,848 B2 * | 5/2015 | Sato | ................ | H02M 3/33592 363/21.06 |
| 9,035,557 B2 * | 5/2015 | Shiu | ................ | H05B 33/0887 315/122 |
| 9,236,801 B2 * | 1/2016 | Ouyang | ............. | H02M 3/158 |

(Continued)

OTHER PUBLICATIONS

Search report from STIC EIC searcher John DiGeronimo.*

*Primary Examiner* — Timothy J Dole
*Assistant Examiner* — Htet Z Kyaw
(74) *Attorney, Agent, or Firm* — Shumaker & Sieffert, P.A.

(57) ABSTRACT

Devices, systems, and methods for monitoring overcurrent and zero voltage are disclosed. These devices, systems, and methods monitor an input/output pin of an electronic device to determine a period of time when monitoring for an overcurrent of the input/output pin of the electronic device is not performed and compare a first input voltage to a first reference voltage during the period of time when monitoring for the overcurrent of the input/output pin of the electronic device is not performed so as to determine when a diode is conducting current, the diode being located across a switch being monitored for a zero voltage state, wherein the diode conducting current indicates that the switch is at the zero voltage state.

20 Claims, 6 Drawing Sheets

(56) References Cited

U.S. PATENT DOCUMENTS

| | | | | |
|---|---|---|---|---|
| 2004/0136209 A1* | 7/2004 | Hosokawa | H02M 3/33592 | 363/24 |
| 2004/0227496 A1* | 11/2004 | Hosotani | H02M 1/4208 | 323/282 |
| 2006/0002159 A1* | 1/2006 | Lin | H02M 3/156 | 363/95 |
| 2010/0066337 A1* | 3/2010 | Gong | H02M 1/4225 | 323/285 |
| 2010/0110593 A1* | 5/2010 | Kim | H02M 1/32 | 361/18 |
| 2010/0246231 A1* | 9/2010 | Sirio | H02M 3/1588 | 363/132 |
| 2013/0207625 A1* | 8/2013 | Futamura | G05F 1/10 | 323/271 |
| 2014/0016378 A1* | 1/2014 | Ke | H02H 7/1213 | 363/21.18 |
| 2014/0160601 A1* | 6/2014 | Ouyang | H02M 3/158 | 361/18 |
| 2015/0062988 A1* | 3/2015 | Amirahmadi | H02M 1/083 | 363/97 |
| 2015/0180330 A1* | 6/2015 | Ye | H02M 1/4208 | 363/126 |
| 2015/0207311 A1* | 7/2015 | Chang | H02H 3/20 | 361/91.1 |

* cited by examiner

GATE DRIVER INITIATED ZERO VOLTAGE SWITCH TURN ON

TECHNICAL FIELD

This disclosure relates to zero voltage switching (ZVS) and more particular, to techniques and circuits associated with controlling of zero voltage switching.

BACKGROUND

In some applications, turn-on of power switches is performed with Zero Voltage Switching (ZVS). Using ZVS in, for example, power converters can increase efficiency when compared to conventional hard switching power converters. A power converter using ZVS may eliminate drain circuit switching losses and some gate circuit switching losses. A power converter using ZVS may also eliminate rectifier reverse recovery effects and, in some cases, channel conduction losses.

ZVS turn-on is often achieved by current commutation to a diode in parallel with the switch being turned-on. In some cases, the flow of the current in the diode may clamp the voltage across the switch to a value of approximately 1V, which may be sufficiently close to zero to be considered a zero crossing point. In some instances the voltage across the switch may be negative. Near zero voltage during the turn-on results in zero turn-on losses or near zero turn-on losses, which in combination with reduction in turn-off losses results in very low switching losses and hence a possibility of achieving high operating frequencies.

SUMMARY

In general, techniques and circuits are described that may determine when a diode across a switch is conducting. Conduction of the diode across the switch may be used to determine when zero voltage switching (ZVS) should occur.

In some examples, the disclosure is directed to a method of monitoring overcurrent and zero voltage comprising monitoring an input/output pin of an electronic device to determine a period of time when monitoring for an overcurrent of the input/output pin of the electronic device is not performed, and comparing a first input voltage to a first reference voltage during the period of time when monitoring for the overcurrent of the input/output pin of the electronic device is not performed so as to determine when a diode is conducting current, the diode being located across a switch being monitored for a zero voltage state, wherein the diode conducting current indicates that the switch is at the zero voltage state.

In an example, the disclosure is directed to an electronic device comprising circuitry for monitoring an input/output pin of an electronic device to determine a period of time when monitoring for an overcurrent of the input/output pin of the electronic device is not performed, and a first comparator configured to compare a first input voltage to a first reference voltage during the period of time when monitoring for the overcurrent of the input/output pin of the electronic device is not performed so as to determine when a diode is conducting current, the diode being located across a switch being monitored for a zero voltage state, wherein the diode conducting current indicates that the switch is at the zero voltage state.

In another example, the disclosure is directed to an electronic device comprising means for monitoring an input/output pin of an electronic device to determine a period of time when monitoring for an overcurrent of the input/output pin of the electronic device is not performed, and means for comparing a first input voltage to a first reference voltage during the period of time when monitoring for the overcurrent of the input/output pin of the electronic device is not performed so as to determine when a diode is conducting current, the diode being located across a switch being monitored for a zero voltage state, wherein the diode conducting current indicates that the switch is at the zero voltage state.

The details of one or more examples are set forth in the accompanying drawings and the description below. Other features, objects, and advantages of the disclosure will be apparent from the description and drawings, and from the claims.

DETAILED DESCRIPTION

In general, techniques and circuits are described that may be used in applications where turn-on of power switches, e.g., in a power converter, is performed using Zero Voltage Switching (ZVS). As described above, ZVS turn-on may be often achieved by current commutation using a diode in parallel with a switch that is being turned-on. The flow of the current in the diode clamps the voltage across the switch to a value of approximately 1V, which may be sufficiently close to zero to be considered a zero crossing point. In some instances, the voltage across the metal-oxide semiconductor (MOS) transistor may be a negative voltage. For example, the voltage across the MOS transistor may be a negative voltage when current is flowing from the anode to the cathode of a diode connected to the MOS transistor, with the diode cathode at the MOS drain and the diode anode at the MOS source. For purposes of this application, ZVS may be used to refer to both zero voltage switching and near zero voltage switching, including low positive voltages and low negative voltages. For example, if a diode is conducting it generally has a small voltage across it. For a silicon diode, this voltage may be generally about 0.7 volts. In this disclosure, ZVS may be used to refer to both zero voltage switching and near zero voltage switching related to one or a small number of diode drops. The number of diode drops may be directly related to the number of diodes used in series across a switch being monitored for ZVS. Generally, in some examples, a single diode is used across a switch.

Because power (P) is equal to current (I) times voltage (V) (P=IV), zero voltage or near zero voltage during the turn-on may result in zero turn-on losses or near zero turn-on losses. Low power losses in combination with reduction in turn-off losses may result in very low switching losses. With low switching losses, higher operating frequencies may be achieved in some cases. For example, higher operating frequencies may be possible because less power needs to be dissipated, i.e., as heat for each on-off or off-on transition occurs corresponding to the power loss.

In one example of the systems and methods described in this disclosure, an existing monitoring pin may be used to provide multiple functions. For example, a single monitoring pin may have enhanced functionality that includes one or more original operational functions, as well as an additional implementation of the above mentioned ZVS in order to reuse already existing external circuitry for both original and additional functions. Accordingly, complexity and area consumption are reduced.

In some example power converter designs using ZVS techniques, the turn-on instant may be governed by a controller. The controller may often run a model of the power converter in question. The model may be used to calculate switch timings using measured parameters. The model is often computationally intensive and the results are sensitive to exact component values. Since all components are manufactured with certain tolerances and the exact values may be more or less influenced by converter operation, for example operating temperature, it may be rather difficult to guarantee an optimal power converter operation using a model under all operating conditions. Accordingly, it may be advantageous for systems to use a simplified controller in conjunction with circuitry that derives the turn-on instant from the operating state of the circuitry.

In another example, in accordance with the systems and methods described herein, however, the calculation performed by, e.g., a controller, may be unnecessary because other circuitry may be used to detect a state of various circuitry that indicates when switching of one or more zero voltage switches should occur. For example, determining diode conduction may be used to determine when switching of one or more switches should occur according to a ZVS condition. Determining diode conduction to decide when to turn on a switch according to ZVS condition may reduce the calculations necessary in the controller because the driver, using corresponding circuitry, can control aspects of the operation that were previously performed by the controller. In one example, the turning on of a switch according to a ZVS condition may be performed external to the controller, while turning off may be performed by the controller. When the controller does not need to perform processing to determine when to turn on the switch, i.e., because the determination of when to turn the switch on is made externally to the controller, then the controller does not need to have information describing when the switch should be turned on. The information describing when the switch should be turned on may be referred to as an analytical description of the turning on of the switch. The analytical description of the turning on of the switch may characterize when to turn on the switch. Determining diode conduction using the systems and methods described herein may simplify or eliminate the need for an analytical description of the turning on of the switch because, in some examples, little or no calculation for the determination of when to turning on the switch according to ZVS is needed because the determination may be made external to the controller. Rather, a determination may be made regarding conditions of one or more circuit components that may indicate when the switch according to a ZVS condition should be turned on, e.g., by determining when current is flowing through a diode as described herein. For example, in some cases, the conduction condition of a diode may be monitored to determine when a switch should be turned on. The turn on of the diode may be detected using analog circuitry in a driver of an electronic device, as described in more detail below. In some examples, the conduction condition of a diode may be monitored to determine when a switch according to a ZVS condition should be turned on and a microcontroller may be used to determine when a switch should be turned off. The time when a switch should be turned off may be based on time and current or voltage. For example, the switch may be turned off at startup and/or during times when the load on the circuit being monitored is low. In power converter operation, turn off may be determined at a certain load when the withdrawn of energy from an inductor may be compensated by the current through the switch. Turn off may vary based on the particular circuit and may be related to output power.

As described herein, in one example of the systems and methods described in this disclosure, an existing monitoring pin may be used to provide multiple functions. For example, a single monitoring pin may have enhanced functionality that includes one or more original operational functions, as well as an additional implementation of the above mentioned ZVS in order to reuse already existing external circuitry for both original and additional functions. In an example, over current and the conduction condition of a diode may be monitored using the same pin on a device and reusing some or all of the circuitry providing the original operational function or functions. For example, DESAT circuitry described herein may provide for both overcurrent protection, i.e., original operational function, and detection of a ZVS condition. The conduction condition of a diode may be used to determine when a switch according to a ZVS condition should be turned on. Generally, the systems and methods described herein may be implemented with little or no change to circuitry external to the electronic device. In some examples, an external capacitor may be added or a capacitance value of an external capacitor may be changed.

Figure 1:
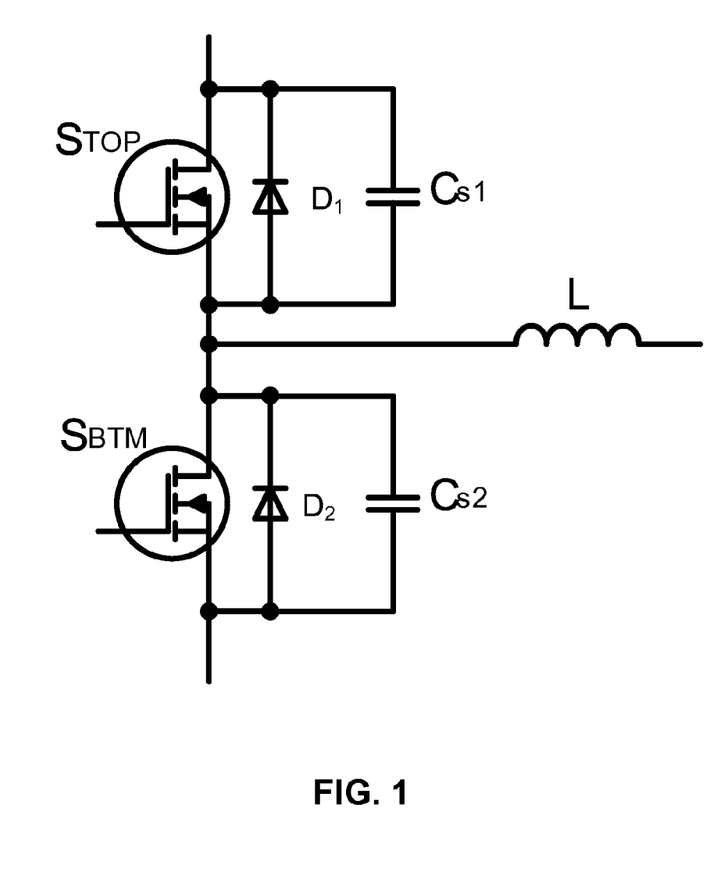
FIG. 1 is a circuit diagram illustrating one example in accordance with one or more aspects of the present disclosure.

FIG. 1 is a circuit diagram illustrating one example in accordance with one or more aspects of the present disclosure. ZVS current commutation is discussed using the example circuit of FIG. 1. The term "current commutation" is used to describe a situation when current being carried by one component moves to being carried by another component, e.g., when current through a diode is diverted to flowing through a switch or when current carried by a switch is diverted to being carried by a diode. For example, current commutation is the situation in which a current being conducted by a diode is taken over by a switch, and vice versa, as a voltage reverses polarity. The diagram in FIG. 1 may be considered to function in four different phases, phase 1, phase 2, phase 3, and phase 4. Initially, the top switch, $S_{TOP}$, is on so that current flows through the top switch, $S_{TOP}$, and through inductor L. In phase 1, the top switch $S_{TOP}$ may be turned-off, so that the top switch, $S_{TOP}$, is no longer conducting current. Current through an inductor, in this case, inductor, L, does not instantaneously decrease to zero. Thus, in phase 2, current may be commutated to "snubber" capacitors, $C_{S1}$ and $C_{S2}$, and through inductor, L. Accordingly, in phase 2, current flows from each "snubber" capacitors, $C_{S1}$ and $C_{S2}$, and through inductor, L. Voltage across the top switch, $S_{TOP}$, may be fixed to "zero" for low turn-off losses and snubber capacitor $C_{S1}$ is charged and snubber capacitor $C_{S2}$ is discharged prior to the turn-on of the bottom switch, $S_{BTM}$. In phase 3, the current may be commutated to antiparallel diode, $D_2$. Thus, current flows up through diode, $D_2$, and through an inductor, L. In phase 4 the bottom switch, $S_{BTM}$ may be turned on. Accordingly, in phase 4 current flows through the bottom switch, $S_{BTM}$ and through an inductor, L.

Figure 2:
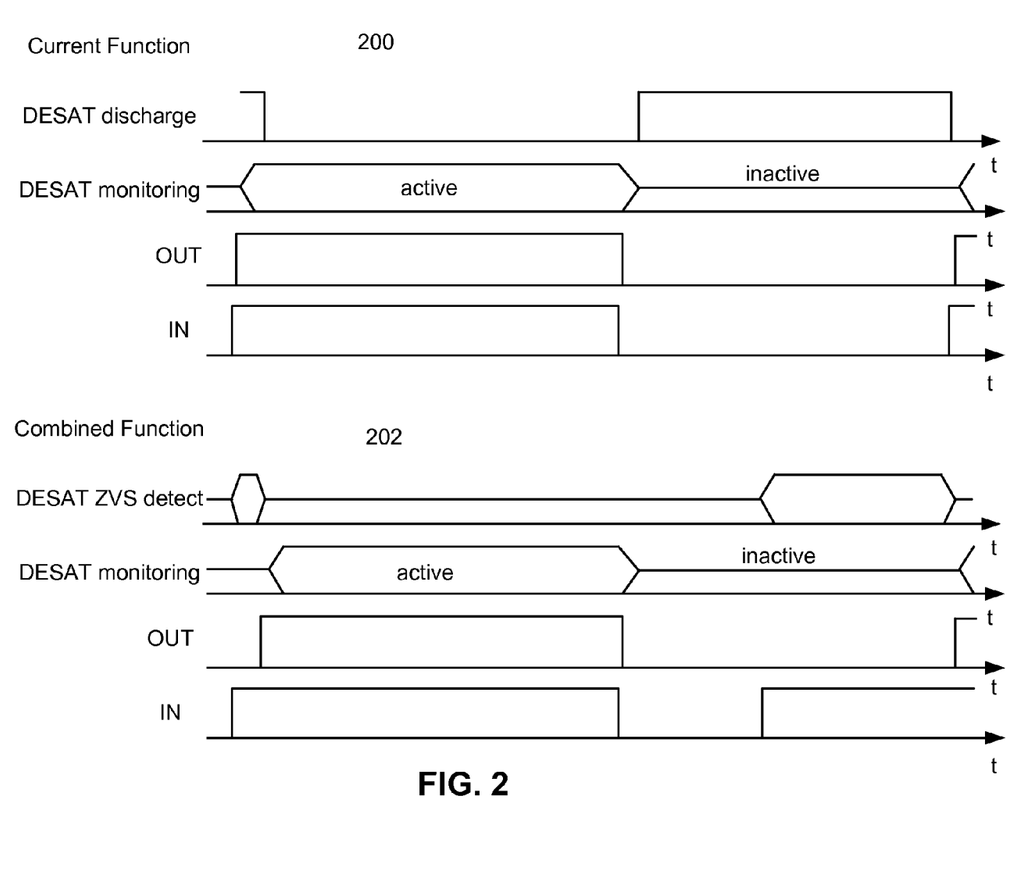
FIG. 2 is a timing diagram illustrating an example current function of a circuit in accordance with one or more aspects of the present disclosure.

FIG. 2 is a timing diagram illustrating an example current function of a circuit in accordance with one or more aspects of the present disclosure. FIG. 2 illustrates both a current function and a combined function. The top timing diagram 200 labelled "Current Function" illustrates desaturation (DESAT) monitoring functionality. DESAT monitoring functionality monitors for an overcurrent situation. In some examples, DESAT monitoring may be active shortly after the power device is turned-on. A DESAT pin may be connected to ground by an internal MOSFET when the power device is OFF, which provides protection of the IC from voltage spikes and noise originating in the power circuit.

Referring to the top timing diagram 200, illustrated in FIG. 2, a DESAT discharge signal is illustrated. The DESAT discharge signal may control when the overcurrent monitoring is active. For example, when the DESAT discharge signal is low, DESAT overcurrent monitoring will be active. When the DESAT discharge signal is high, DESAT overcurrent monitoring will be inactive. The output and input wave forms are active during the active DESAT overcurrent monitoring.

As top timing diagram 200 in FIG. 2 illustrates, a period of time exists when DESAT overcurrent monitoring is inactive. During this period of time, when the DESAT overcurrent monitoring is inactive, the DESAT pin is not being used. Accordingly, the DESAT pin may be used to perform additional functionality during this time, such as DESAT ZVS detection. The bottom timing diagram 202 of FIG. 2 is labelled "Combined Functionality" and illustrates an example of a combination of DESAT overcurrent monitoring and DESAT ZVS detection. Thus, in accordance with one or more aspects of the present disclosure, the combined functionality of DESAT overcurrent monitoring and DESAT ZVS detection, may be implemented. The activation of the ZVS detection function can be combined with the input signal as illustrated in FIG. 2, as described with respect to FIG. 3, below. Thus, a single input pin, e.g., DESAT_pin of FIG. 3 described below may perform the combined functionality of DESAT overcurrent monitoring and DESAT ZVS detection. The combined functionality of DESAT overcurrent monitoring and DESAT ZVS detection may give the user an additional method of control to shut down the automated turn on of the switch. For example, it may also be possible to activate the ZVS detection as soon as the DESAT overcurrent monitoring becomes inactive. Additionally, in some examples, ZVS detection may be performed for circuit deactivation. For example, circuit deactivation may be controlled by control signals such as an enable signal or a shutdown signal which may be controlled by a PWM generator (e.g., PWM generator 312 in FIG. 3) or other control circuitry.

As illustrated with respect to the combined functionality of DESAT overcurrent monitoring and DESAT ZVS detection in FIG. 2, DESAT overcurrent monitoring may have an active period and an inactive period. During the inactive DESAT overcurrent monitoring period of time, DESAT ZVS detection may be performed, as illustrated. Accordingly, the DESAT circuitry described herein may provide for both overcurrent protection, i.e., the general DESAT circuitry functionality (i.e., original operational function), and detection of a ZVS condition to determine when a switch should be turned on according to the ZVS condition.

Figure 3:
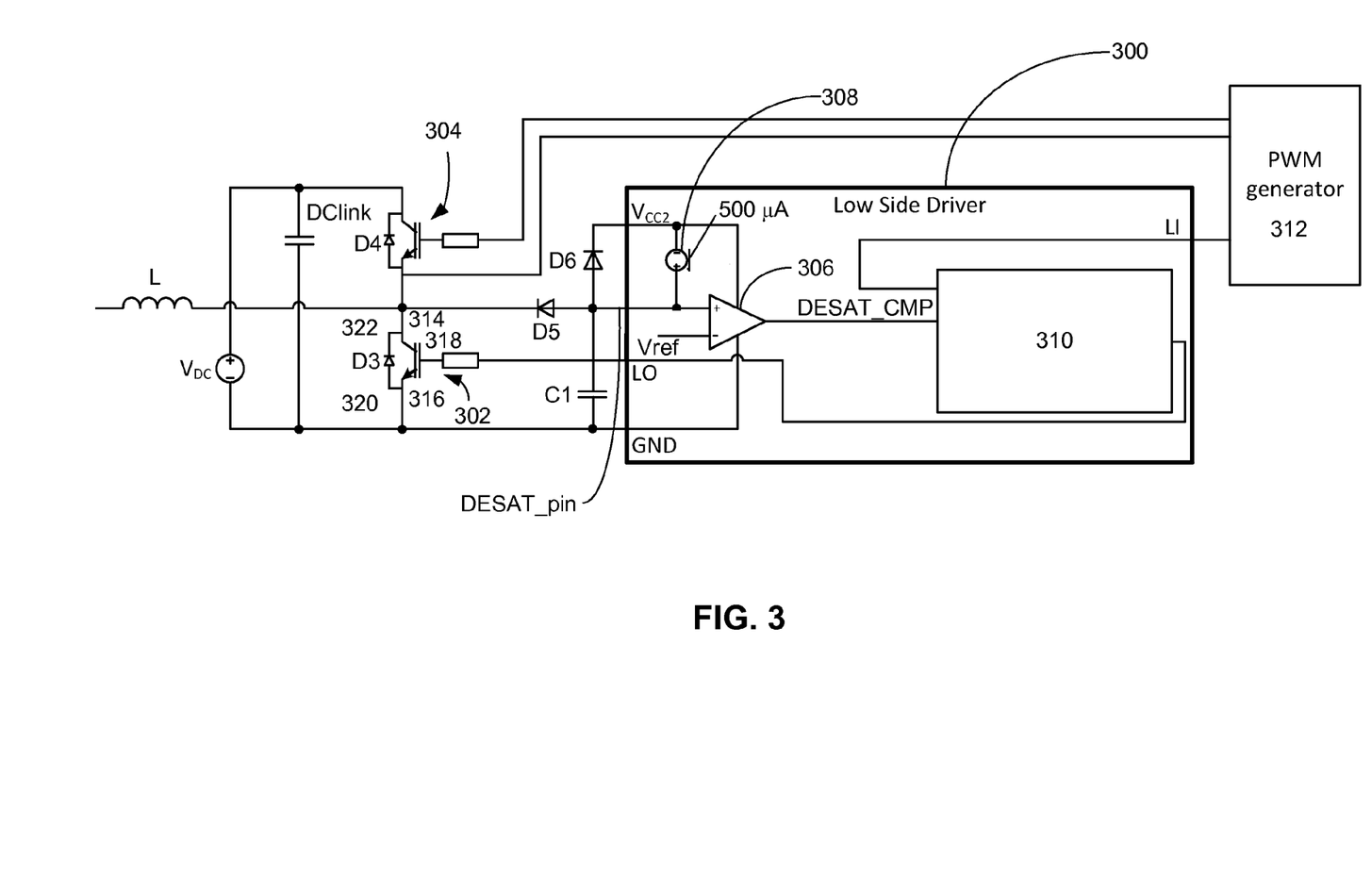
FIG. 3 is a combined block and circuit diagram of a system implementing Zero Voltage Switching (ZVS) turn on and desaturation (DESAT) in accordance with one or more aspects of the present disclosure.

FIG. 3 is a combined block and circuit diagram of a system implementing ZVS turn on and DESAT in accordance with one or more aspects of the present disclosure. In the illustrated example of FIG. 3, low side driver circuitry 300 includes a monitoring pin (DESAT) that is used to provide multiple functions. For example, the DESAT pin may provide for detection of overcurrent and detection of a ZVS condition to determine when a switch turn on should occur, e.g., when diode $D_3$ is conducting. The turn off time of the switch after ZVS (i.e., after turning on the switch according to the ZVS condition) may still be calculated, for example, in a microcontroller.

In the illustrated example of FIG. 3, the DESAT pin has enhanced functionality that includes the original operational function and the additional implementation of the above mentioned ZVS to reuse already existing external circuitry for both functions and therefore reduce complexity and area consumption. Generally, during times when DESAT monitoring is active, e.g., as illustrated in FIG. 2, when the DESAT monitoring signal on bottom timing diagram 202 is active, then DESAT monitoring is "active." When DESAT monitoring is active, the DESAT pin may be used for DESAT monitoring. During times when DESAT monitoring is inactive, e.g., as illustrated in FIG. 2, when the DESAT monitoring signal on the bottom timing diagram 202 is inactive, then DESAT monitoring is "inactive." When DESAT monitoring is inactive, the DESAT pin may be used to monitor for ZVS as described herein. FIG. 3 illustrates an example circuit that may incorporate both DESAT monitoring and ZVS as described herein. In the example of FIG. 3, DESAT monitoring may occur when the switch, transistor 302, is on. In the example of FIG. 3, when the switch is off, DESAT monitoring does not occur and ZVS may occur. FIG. 2 generally illustrates example timing that may be used to implement the concept of DESAT monitoring and ZVS using a single input pin to implement both functionalities. FIG. 3 illustrates one specific example that implement the concept of DESAT monitoring and ZVS using a single input pin to implement both functionalities.

The illustrated example of FIG. 3 may simplify the use of ZVS by using a gate driver that reacts based on ZVS intervals. Such a ZVS may automatically turn on the power switch if desired. This approach simplifies the controller since the turn-on instant may be derived from the real circuit operating state. This approach may also be insensitive to component tolerances and variations due to temperature variations and other causes.

In one example, the existing gate driver DESAT circuitry may be modified. This modification may enable an advanced gate driver feature which may be desirable in ZVS based power converters. In some examples, DESAT overcurrent monitoring functionality may be active only during an output "ON" state and resides in a discharge state without monitoring the voltage levels at this pin during output "OFF." In some examples, the ON state is when a particular switch is on and being monitored at that particular time and the OFF state is when the particular switch is off and not being monitored at that particular time.

In some examples, with a combined implementation of ZVS and DESAT, the discharge state, i.e., the first signal illustrated in FIG. 2, top timing diagram 200, may no longer be used. During the time when the DESAT discharge signal is not used, the DESAT monitoring signal may be active such that monitoring circuitry described herein may be used to monitor the DESAT pin voltage level to detect the zero voltage condition which will internally result in the automated activation of the output (turn ON).

FIG. 3 is a combined block and circuit diagram of a system implementing ZVS turn on and DESAT monitoring in accordance with one or more aspects of the present disclosure. The examples illustrated in FIG. 3 may implement continuous DESAT signal evaluation and may modify the function of the circuitry which handles the DESAT signal. In particular, FIG. 3 is a diagram illustrating example functionality consistent with this disclosure for a switch, e.g., a lower switch, transistor 302. Thus, in the illustrated example of FIG. 3, the lower switch, transistor 302, is monitored. However, an upper switch, transistor 304, may be monitored using the same or similar circuitry coupled to upper switch, transistor 304, in the same or similar way. Thus, it will be understood that circuitry the same or similar to low side driver circuitry 300 may be connected to the upper switch, transistor 304, in order to provide the functionality described herein with respect to the upper switch. In some cases, both transistors 302 and 304 may be monitored. It will also be understood that circuitry the same or similar to low side driver circuitry 300 may be used in conjunction with upper switch, transistor 304, to provide ZVS and over current monitoring. Circuitry the same or similar to low side driver circuitry 300 may be connected to the upper switch, which may be referred to as the "high side." When circuitry the same or similar to low side driver circuitry 300 is used on the high side, i.e., "high side driver circuitry," the high side driver circuitry may be in addition to low side driver circuitry 300, i.e., a high side driver circuit may be used in conjunction with transistor 304 and low side driver 300 may be used in conjunction with transistor 302. In another example, high side driver circuitry may be used instead of low side driver circuitry 300, e.g., the high side driver circuitry alone, without low side driver circuitry 300. Or, as illustrated in FIG. 3, low side driver circuitry 300 may be used without high side driver circuitry. The selection of low side driver circuitry 300 and high side driver circuitry depends on which switch or switches are to be provided with ZVS and over current monitoring.

In some examples, DESAT is an input to a positive input pin on an operational amplifier 306. A reference voltage, Vref, 6 volts in this example, may be an input to the negative input of the operational amplifier 306. Accordingly, operational amplifier 306 may be used to implement a comparator that compares the voltage on the DESAT pin to a 6 volt reference, Vref. If DESAT is lower than 6 volts, then DESAT_CMP (DESAT compare) is low. Conversely, if DESAT is higher than 6 volts, then DESAT_CMP is high. In the illustrated example, as will be described in more detail below, a single operational amplifier 306 may be used to perform the comparison DESAT_CMP and the reference voltage which may be used for both determining over current situations and ZVS. Thus, a single operational amplifier may be used for both comparisons by performing a comparison for determining over current situations during a first time interval and a comparison for determining ZVS during a second time interval.

In other examples, e.g., other circuit topologies, multiple operational amplifiers may be used, e.g., one operational amplifier to perform a compare to determine an over current situation and one operational amplifier to perform a compare to determine ZVS. For example, multiple operational amplifiers may be used when the turn on threshold and the over current threshold are different. Thus, parallel circuitry, with separate comparison circuitry, including separate operational amplifiers, may be used in some examples.

Referring now to the example of FIG. 3 that uses a single operation amplifier 306, when the lower switch is conducting, current may flow out from the DESAT pin, through diode $D_5$ and through the lower switch to ground. During normal operation, e.g., when not in an over current situation, the voltage across diode $D_5$ and the lower switch 302 will generally be less than 6 volts. For example, the voltage across diode $D_5$ may be about 0.7 volts and the voltage across the lower switch, transistor 302 may be about 2 volts, for a total at DESAT_pin of about 2.7 volts, which is less than 6 volts. Accordingly, DESAT_CMP will be low.

The circuitry of FIG. 3 may monitor for an over current situation through the lower switch. Overcurrent may be caused, for example, by a large amount of current flowing through the lower switch 302 from the top switch, transistor 304, from the inductor, L, or both the top switch, transistor 304, and the inductor, L. In an over current situation, the voltage across the lower switch 302 will increase, for example, to 12 volts, 20 volts, 200 volts, or higher. At some point the voltage will increase enough so that diode $D_5$ will turn off. With diode $D_5$ off, current from current source 308 will charge capacitor $C_1$. Accordingly, the voltage on the DESAT pin will increase. If the over current situation continues, the voltage on the DESAT pin will increase until it is greater than 6 volts and DESAT_CMP will be a high voltage and the lower switch 302 may be disabled.

When the lower switch 302 is off the circuitry of FIG. 3 may be used for ZVS to determine when diode $D_3$ is conducting. Diode D3 will generally be considered to be conducting when diode D3 is forward biased, e.g., a positive voltage on anode 320 and a negative voltage on cathode 322, so that current flows from anode 320 to cathode 322. In an ideal diode the forward biased region includes any voltage greater than 0 volts between anode 320 and cathode 322. In some examples, a silicon diode may be considered to be forward biased at about 0.6 to 0.7 volts between anode 320 and cathode 322. A germanium diode may be considered to be forward biased at between 0.2 and 0.3 V between anode 320 and cathode 322. The scope of the inventive concept is not limited to a diode type, and other types of diodes may be used (e.g., silicon carbide diodes, etc.).

Similar to the example illustrated in FIG. 1, in FIG. 3, initially, when monitoring for ZVS, the top switch, transistor 304, may be "on" so that current flows through the top switch, transistor 304, and through inductor L. Assuming the voltage at DClink is high enough to keep diode $D_5$ turned off, capacitor $C_1$ will be charged by current source 308.

Current through an inductor cannot instantaneously change, and therefore, when top switch, transistor 304, is turned off and is no longer conducting, the current can be commutated to capacitor $C_1$ and through an inductor, L. Thus, the charge on capacitor $C_1$ can be allowed to discharge through diode $D_5$ and inductor L. For the voltage across the bottom switch to be at or near zero, capacitor $C_1$ may be discharged prior to the turn-on of the bottom switch, transistor 302. Thus, the current may be commutated to capacitor $C_1$. Next, the current can be commutated to diode, $D_3$. Thus, current flows up through diode, $D_3$, and through inductor, L. When current is flowing across diode $D_3$ the voltage across the bottom switch 302 will be at or near zero volts, as the voltage drop across a conducting diode may be generally about 0.7 volts. The voltage drop of 0.7 volts may be sufficiently close to zero to be considered a zero crossing point. Accordingly, when current may be flowing across diode $D_3$ the voltage across the bottom switch 302 will be at or near zero volts for low turn-off losses. The bottom switch, transistor 302, may then be turned-on with approximately zero voltage switching, e.g., 0.7 volts. When the voltage across the bottom switch 302 is near 0 volts, current from current source 308 and/or capacitor $C_1$ may flow though diode $D_5$. At some point a voltage across capacitor $C_1$ may drop below the reference voltage Vref, which may be, for example, 6 volts. When the voltage across capacitor $C_1$ drops below the reference voltage Vref this may indicate a ZVS condition, as is discussed in more detail below.

The lower switch 302 may be controlled by control circuitry 310. Control circuitry 310 may be used to determine over current situations and ZVS situations.

One possible implementation for control circuitry 310 may be as follows. The treatment of the DESAT pin signal may be similar to approaches that do not combine both ZVS and DESAT monitoring, but discharge circuitry used in examples that only provide DESAT monitoring functionality may be replaced by circuitry for ZVS. This may be done in order to enable detection of the antiparallel diode turn-on which occurs during the off state of the power switch. The DESAT pin signal may first be compared with a reference threshold. As illustrated in FIG. 3, the same reference voltage, e.g., 6V, may be used for overcurrent detection as for the ZVS state detection. The result of the comparison may be further evaluated by a logic circuit which determines the state of the power switch and takes a necessary action. The function of the logic circuit may be as follows:

As illustrated in FIG. 3, PWM generator 312 outputs an enable signal, LI, which is an input of control circuitry 310. Additionally, enable signal, LO is an output of control circuitry 310 that is connected to the gate of transistor 302 through an impedance, e.g., a resistance, inductance, capacitance, or some combination of these at gate 318. If the DESAT_CMP signal, i.e., the result of the compare using operational amplifier 306, is at a logic low state and enable signal LI is at a logic high state, then diode $D_3$ is conducting and an enable signal, LO, may be set to a logic high state with ZVS, as described in more detail below. If DESAT_CMP is high and LO is high, i.e., the lower switch, transistor 302, is enabled, then an overcurrent situation may be occurring, as described above, and blocking of all outputs may be required.

Circuitry described herein may be used to generate signals for ZVS turn-on, and the enable signal, LI, coming from the PWM generator may be delayed until the current commutates to the antiparallel diode, $D_3$. Voltage across the bottom switch 302 may go to zero and the DESAT pin voltage may go to zero as well. A delayed enable signal, LO, that controls the lower switch 302 transitions to high only when the voltage across the power switch 302 is close to zero, or sufficiently close to zero to be considered a zero crossing point. The delay may keep switching from occurring at times when the voltage across the power switch 302 is not at or close to zero. PWM generator 312 (controller) may request the switch turn on first (LI going high), but the switch might only be turned on (LO going high) when the ZVS conditions are present. The delay of the LO signal may be through a series of gates, latches, flip flops, and other circuitry. An example of such circuitry is discussed with respect to FIG. 4.

In case of an overcurrent, for example, after a short circuit has occurred, the output current $I_L$ may increase. The overcurrent may be detected by a gate driver, e.g., control circuitry 310 driving the LO signal. In one example, all the gate signals, e.g., LO, may be immediately stopped and the output current $I_L$ may then decrease. The systems and methods described herein may preserve overcurrent detection function of the DESAT circuit while allowing for ZVS turn-on initiated by the gate driver.

In some examples, synchronous rectification may be used. For example, MOSFETs may be used in place of diodes. The MOSFETs may be turned-on while the antiparallel diode conducts to reduce conduction losses. This may be especially effective in low voltage applications. Commutation of current to a diode is mostly circuit driven. Synchronous rectification may be most effective when the MOSFET turns on as soon as the diode starts conducting. Turning on the MOSFET at or near when the diode starts conducting may be provided by the systems and methods described herein.

The systems and methods described herein for the turning on of power switches, e.g., in a power converter, may be performed using ZVS and may be used in conjunction with many different types of power converters, for example, H-bridge power converters, full-bridge DC-DC power converters, boost power converters, buck power converters, and boost-buck power converters, to name a few.

In the example of FIG. 3, with circuitry the same or similar to low side driver circuitry 300 connected to top switch, transistor 304, conducting of diode $D_4$ may be used to indicate that the top switch should be turned on. In other words, diode $D_4$ of the top switch may serve the same or similar purpose to diode $D_3$ of the bottom switch. Diode $D_6$ keeps the voltage at the capacitor $C_1$ below $V_{CC2}$.

Some examples may monitor an input/output pin of an electronic device of a modulator to determine a period of time when monitoring for an overcurrent of an the input/output pin of an the electronic device is not performed. Generally, an input/output pin on an electronic device may be a pin that may perform input functionality and output functionality. As used herein, an input/output pin may be an input pin, an output pin, or a pin that may perform input functionality and output functionality.

In the example of FIG. 3, low side driver circuitry 300 monitors an output pin (LI) of a modulator, such as pulse width modulation (PWM) generator 312, to determine a period of time when monitoring for an overcurrent of the output pin of an electronic device is or is not performed. Generally, in some examples, overcurrent will only be monitored when the switch is in the on state, e.g., LI high and LO high. In another example, another modulator, such as a pulse density modulation (PDM) generator, may be used in place of pulse width modulation (PWM) generator 312. Generally, the term input/output pin refers to a pin on an electronic device that connects to circuitry that can perform input functionality and output functionality. As used herein, however, the term input/output pin refers to an input pin on an electronic device that connects to input circuitry in the electronic device, an output pin on an electronic device that connects to output circuitry in the electronic device, or a pin on an electronic device that connects to circuitry in the electronic device that can perform input functionality and output functionality.

A comparison circuit, such as a comparison circuit including an operational amplifier 306 compares a first input voltage, e.g., on DESAT_pin, to a first reference voltage, e.g., Vref, during the period of time when monitoring for the overcurrent, e.g., through transistor 302, is not performed so as to determine when a diode $D_3$ across a switch, e.g., transistor 302, is conducting. As illustrated in FIG. 3, one example of a diode across a switch is diode $D_3$ across transistor 302. In the example of FIG. 3 transistor 302 is an N-channel insulated gate bipolar transistor (IGBT) having a collector 314, an emitter 316, and a gate 318. Diode $D_3$ includes an anode 320 and a cathode 322. Anode 320 of diode $D_3$ is connected to emitter 316 of transistor 302. Cathode 322 of diode $D_3$ is connected to collector 314 of transistor 302. Accordingly, as defined herein, diode D3 is across a switch, e.g., transistor 302. It will be understood that other configurations may be used. These other configurations will generally depend on the type of switch used. Generally the diode will be connected such that the anode is connected to one of a switch's current carrying terminals and the cathode is connected to another of the switch's current carrying terminals. The diode will generally not be connected to any control signal on the switch. Conducting of diode $D_3$ across the switch indicates that a zero voltage state across the switch is occurring. The zero voltage state includes states when zero or a low voltage, such as 0.7 volts, is across the switch. As described herein, when the voltage across the bottom transistor 302 is near 0 volts, e.g., 0 volts, small positive voltages, or negative voltages, current from current source 308 and/or capacitor $C_1$ may flow though diode $D_5$. At some point a voltage across capacitor $C_1$ may drop below the reference voltage, e.g., 6V, which may indicate a ZVS condition, as described herein.

In the example of FIG. 3, a switch, such as transistor 302, may be turned on based on a comparison of an input voltage at the DESAT pin to a reference voltage, e.g., Vref. The comparison of the input voltage at the DESAT pin to the reference voltage may occur during the period of time when monitoring for the overcurrent of the input/output pin of the electronic device is not performed. The switch, e.g., transistor 302, may be turned on when diode $D_3$, across the switch, is conducting. If the diode across the switch is conducting, then the voltage across the switch is low, e.g., 0.7 volts for a silicon diode. This may be considered zero in this application with respect to zero voltage switching. Accordingly, the switch may be turned on when the diode across a switch is conducting.

Additionally, low side driver circuitry 300 monitors an enable signal, e.g., the LI signal, on the switch, e.g., transistor 302, to determine a period of time when monitoring for an overcurrent of the input/output pin of the electronic device is performed and/or is not performed, e.g., when the transistor 302 is not conducting. Transistor 302 is not conducting when it is turned off, e.g., using the LO, which is an output signal of low side driver circuitry 300. A comparison circuit, such as a comparison circuit including an operational amplifier 306 compares an input voltage at the DESAT pin to a reference voltage, Vref during the period of time when monitoring for the overcurrent of the input/output pin of the electronic device is performed to determine when an overcurrent of the input/output pin of the electronic device is occurring. While FIG. 3 illustrates a single instance of combining DESAT and ZVS functionality, it will be understood that DESAT and ZVS functionality may be applied to multiple switches by adding the same or similar circuitry across each switch to be monitored for ZVS and for DESAT, e.g., overcurrent situations.

However, in some examples, the first input voltage and the second input voltage may be the voltage on a single pin at two different times, e.g., the DESAT_pin, during overcurrent monitoring or during ZVS monitoring. Additionally, the first reference voltage and the second reference voltage may be two separate voltage references. These two separate voltage references may have the same or different voltages. However, the first reference voltage and the second reference voltage may be a single voltage reference, e.g., 6V at Vref.

Figure 4:
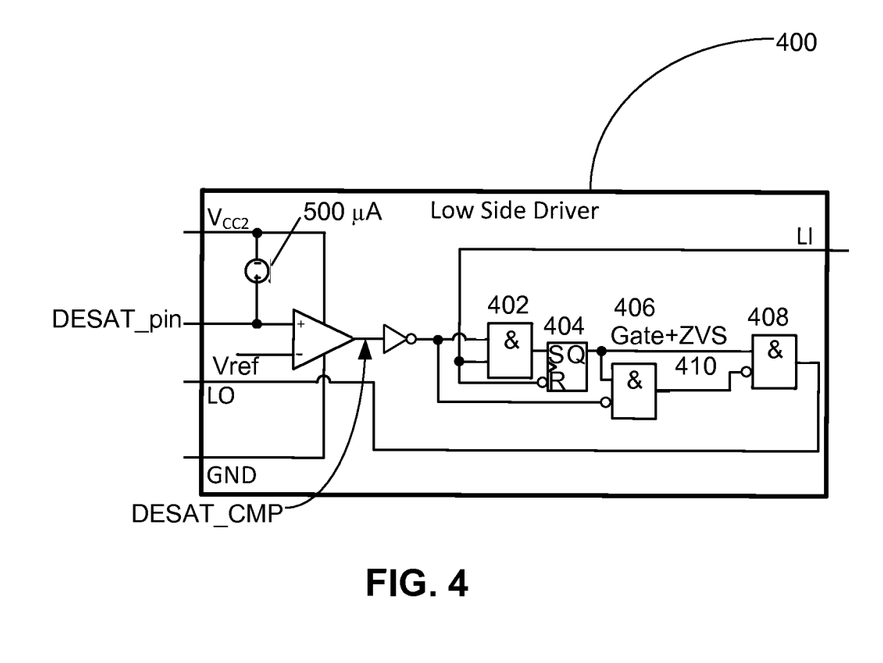
FIG. 4 is block diagram illustrating one example of a low side driver in accordance with one or more aspects of the present disclosure.

FIG. 4 is a block diagram illustrating an example 400 of low side driver circuitry 300 of FIG. 3, in accordance with one or more aspects of the present disclosure. An example first state may have the following initial conditions, an "off state" may be requested for a switch, e.g., transistor 302 of FIG. 3. The switch may initially be in the "off state." A diode, e.g., diode $D_3$, may be off $V_{CE}$ ($V_{DS}$) may be the voltage across the DClink capacitor. The off state may be requested for the switch by outputting a logic "0" value on the LI output of PWM generator 312 of FIG. 3. The voltage across the switch, e.g., transistor 302, may be at or near $V_{DS}$ if transistor 304 is on. $V_{DS}$ is the voltage across the DClink capacitor. Assuming transistor 304 is on, in the first state, diode $D_3$ across the switch, e.g., transistor 302, may be off, as diode $D_3$ is reversed biased (assuming $V_{AC}$ is positive).

In the first state, the comparison of the reference voltage and DESAT_PIN results in a logic "1," output from operational amplifier 306, assuming $V_{AC}$ is greater than 6 volts. Accordingly, DESAT_CMP may be a logic "1" during the first state. Additionally, with LI equal to a logic "0," in the first state, and the inverted version of DESAT_CMP a logic "0," the output of AND gate 402 will also be a logic "0" in the first state. Thus, the "S" input of SR flip flop 404 is a logic "0" and the "R" input of SR flip flop 404 a logic "1," i.e., an inverted version of LI. Thus, SR flip flop 404 is held reset and the output of SR flip flop 404 will be a logic "0." The output of AND gate 406 will also be a logic "0" and the output of AND gate 408, LO, will be a logic "0." With LO equal to a logic "0," the base of transistor 302 will be low and, accordingly, the switch, e.g., transistor 302 is off.

An example second state may have the following initial conditions, an "on state" may be requested for the switch. The switch may initially be in an the "off state." The diode may be off $V_{CE}$ ($V_{DS}$) may be the voltage across the DClink capacitor. In the second state, the "on state" may be requested for the switch by outputting a logic "1" from the LI output of PWM generator 312 of FIG. 3. The voltage across the switch, e.g., transistor 302, may be at or near $V_{AC}$ if transistor 304 is on. Accordingly, assuming transistor 304 is on, in the second state, a diode across the switch, e.g., $D_3$ across transistor 302, may be off, as diode $D_3$ is reversed biased (assuming $V_{DC}$ is positive).

In the second state, the comparison of the reference voltage and DESAT_PIN is a logic "1," assuming $V_{DC}$ is greater than 6 volts. Accordingly, DESAT_CMP may be a logic "1" in the second state. Additionally, with LI equal to a logic "1," and the inverted version of DESAT_CMP a logic "0," the output of AND gate 402 will also be a logic "0" in the second state. Thus, the "S" input of SR flip flop 404 is a logic "0." Here, unlike the first state, the "R" input of SR flip flop 404 a logic "0." Thus, SR flip flop 404 will hold the previous value, logic "0" and the output of SR flip flop 404 will be a logic "0." The output of AND gate 406 will be a logic 0. The output of AND gate 408, LO, will be a logic "0," and the base of transistor 302 will continue to be low and, accordingly, transistor 302 is off. Accordingly, the switch, e.g., transistor 302, which may have initially been off may be turned on during the second state.

An example third state may have the following initial conditions, an "on state" may be requested for the switch. The switch may initially be in an the "off state." The diode may be on. $V_{CE}$ ($V_{DS}$) may be at 0 volts. In the example third state, the "on state" may be requested for a switch, e.g., transistor 302 of FIG. 3 by outputting a logic "1" from the LI output of PWM generator 312 of FIG. 3. The voltage across the switch, e.g., transistor 302, may be at or near zero, e.g., when transistor 302 is on, transistor 304 is off, and capacitor C1 has discharged through transistor 302. Accordingly, the diode across the switch, e.g., $D_3$ across transistor 302, may be on, as diode $D_3$ may be at approximately 1 volt.

In the third state, the comparison of the reference voltage and DESAT_PIN is a logic "0." Accordingly, DESAT_CMP may be a logic "0" in the third state. Additionally, with LI equal to a logic "1," and the inverted version of DESAT_CMP a logic "1," the output of AND gate 402 will also be a logic "1" in the third state. Thus, the "S" input of SR flip flop 404 is a logic "1" and the "R" input of SR flip flop 404 may be a logic "0." Thus, the output of SR flip flop 404 may be a logic "1." The output of AND gate 406 will be a logic 0. The output of AND gate 408, LO, will be a logic "1." Transistor 302, which is initially off, is turned on by the transition of LO from a logic "0" to a logic "1".

An example fourth state may have the following initial conditions, an "off state" may be requested for the switch. The switch may initially be in an the "on state." The diode may be on. $V_{CE}$ ($V_{DS}$) may be at 0 volts. In the fourth state, the "off state" may be requested for a switch, e.g., transistor 302 of FIG. 3 by outputting a logic "0" from the LI output of PWM generator 312 of FIG. 3. The voltage across the switch, e.g., transistor 302, may be at or near zero. Accordingly, the diode across the switch, e.g., $D_3$ across transistor 302, may be on, as diode $D_3$ may be at approximately 1 volt.

In the fourth state, the comparison of the reference voltage and DESAT_PIN is a logic "0." Accordingly, DESAT_CMP may be a logic "0" in the third state. Additionally, with LI equal to a logic "0," and the inverted version of DESAT_CMP a logic "1," the output of AND gate 402 will also be a logic "0" in the fourth state. Thus, the "S" input of SR flip flop 404 is a logic "0" and the "R" input of SR flip flop 404 may be a logic "1." Thus, the output of SR flip flop 404 may be a logic "0." The output of AND gate 406 will be a logic 0. The output of AND gate 408, LO, will be a logic "0." Transistor 302 is initially on and is turned off by the LO transition from a logic "1" to a logic "0.".

An example fifth state may have the following initial conditions, an "on state" may be requested for the switch. The switch may initially be in an the "on state." The diode may be off $V_{CE}$ ($V_{DS}$) may be greater than 6 volts. In a fifth state, which may occur after state three in case of an overcurrent, i.e., state 3 may be followed by either one of the fourth state or the fifth state, an "on state" may be requested for a switch, e.g., transistor 302 of FIG. 3. The on state may be requested by outputting a logic "1" from the LI output of PWM generator 312 of FIG. 3. The voltage across the switch, e.g., transistor 302, may be greater than 6 volts and the switch, transistor 302 is on, and the diode across the switch, e.g., diode $D_3$, may be off.

In the fifth state, the comparison of the reference voltage and DESAT_PIN is a logic "1." Accordingly, DESAT_CMP may be a logic "1" in the fifth state. Additionally, with LI equal to a logic "1," and the inverted version of DESAT_CMP a logic "0," the output of AND gate 402 will also be a logic "0" in the third state. Thus, SR flip flop 404 will hold the previous value, logic "1" and the output of SR flip flop 404 will be a logic "1." The output of AND gate 406 will be a logic "1." The output of AND gate 408, LO, will be a logic "0." Transistor 302 is initially on and remains on.

Figure 5:
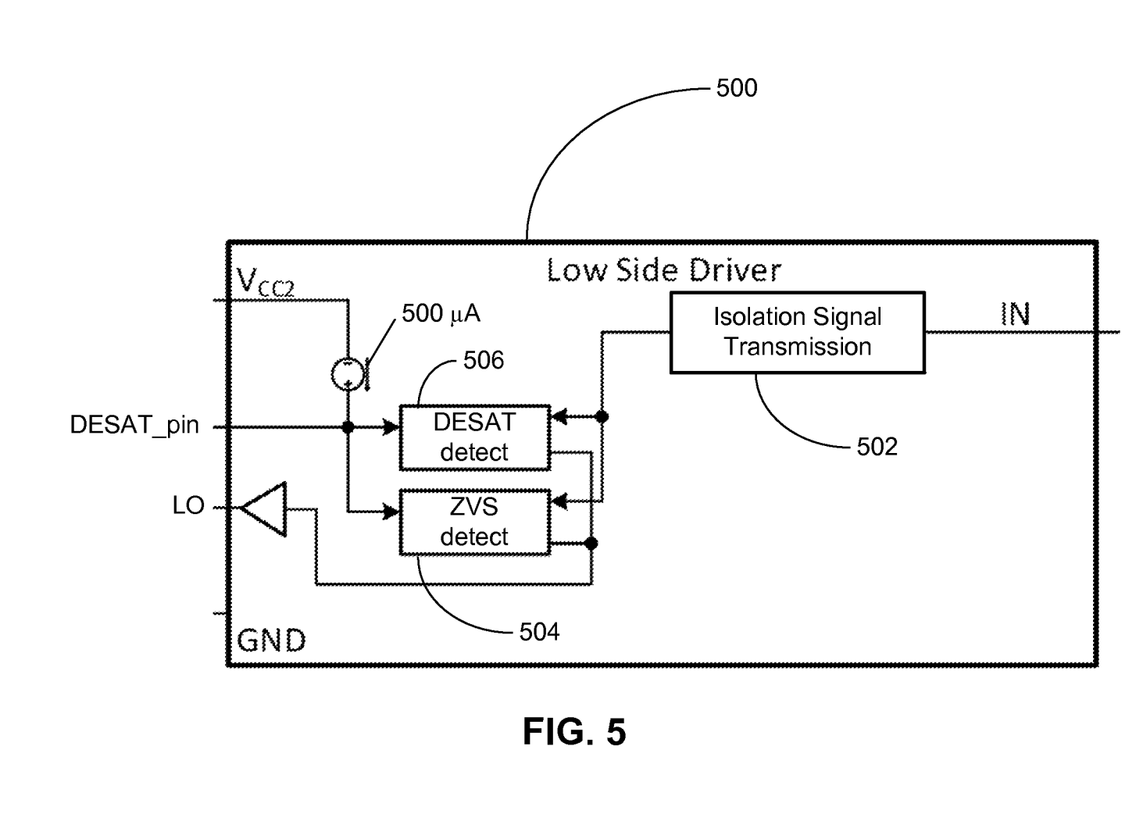
FIG. 5 is a block diagram illustrating another example of a low side driver that may be used in accordance with one or more aspects of the present disclosure.

FIG. 5 is a block diagram illustrating another example 500 of low side driver circuitry 300 of FIG. 3, that may be used in accordance with one or more aspects of the present disclosure. In the illustrated example of FIG. 5, the IN (e.g., the LI input from the PWM generator 312 of FIG. 3) may be buffered through isolation signal transmission circuitry 502, e.g., a buffer. If DESAT_pin is low and IN, is high, then diode $D_3$ (FIG. 3) may be conducting and LO may be turned on by ZVS detect 504, as described above. If DESAT_pin is high and LO is high, i.e., the lower switch, transistor 302 is enabled, then an overcurrent situation may be occurring and DESAT detect 506 may detect the overcurrent, as described above. In an overcurrent situation blocking of all outputs may be required. LO may be a buffered output of DESAT detect and ZVS detect.

Other implementations can continue to use the existing DESAT functionality and extend the gate driver design with an additional ZVS detection circuitry similar to the one mentioned above.

Figure 6:
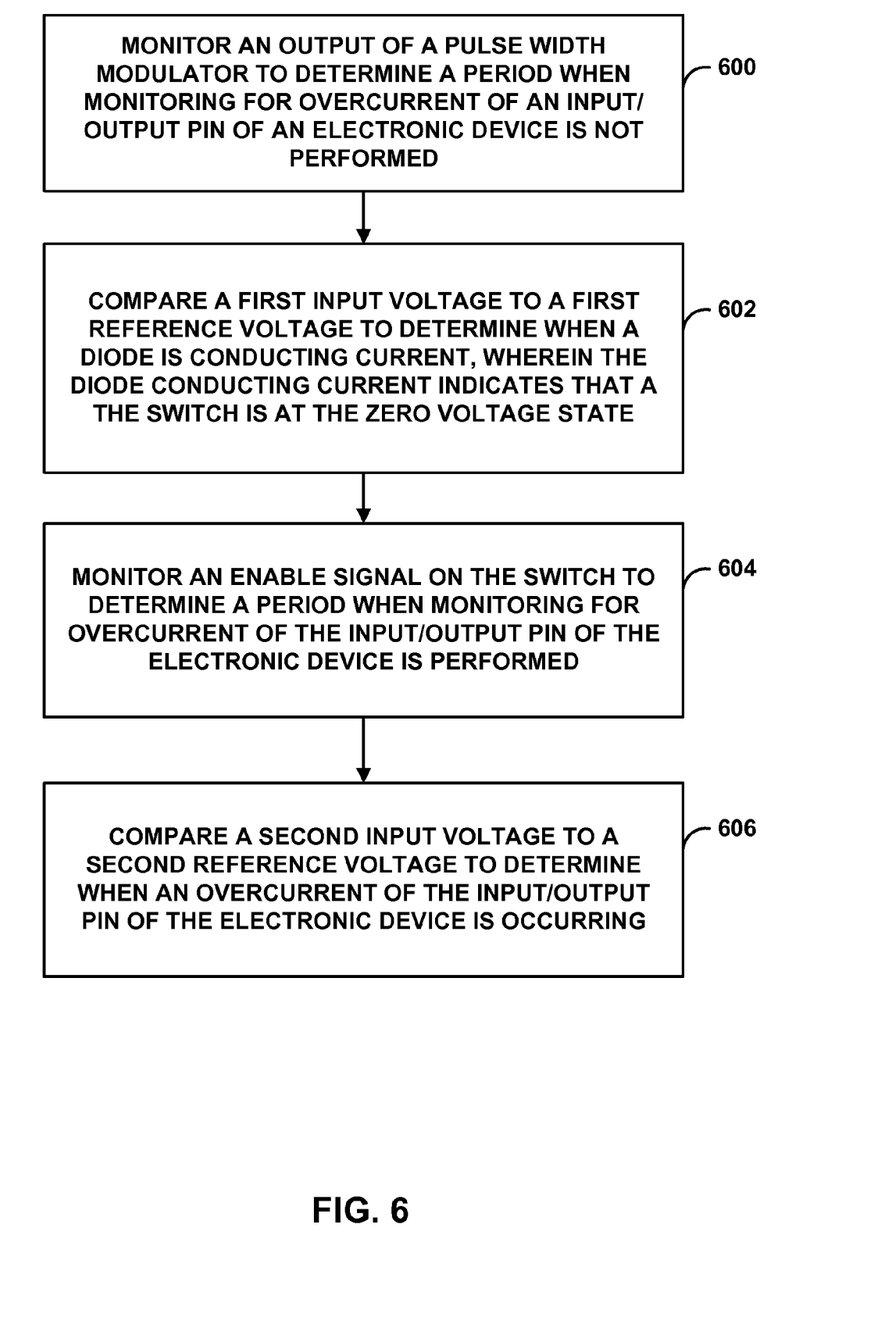
FIG. 6 is a flowchart illustrating an example method of monitoring overcurrent and zero voltage in accordance with one or more aspects of the present disclosure.

FIG. 6 is a flowchart illustrating an example method of monitoring overcurrent and zero voltage in accordance with one or more aspects of the present disclosure. In one example, low side driver circuitry 300 monitors an output of a modulator, such as an output of pulse width modulation (PWM) generator 312, to determine a period of time when monitoring for an overcurrent of an input/output pin of an electronic device is and is not performed (600).

For example, during ZVS monitoring, a comparison circuit, such as a comparison circuit including an operational amplifier 306, compares a first input voltage to a first reference voltage during the period of time when monitoring for the overcurrent of the input/output pin of the electronic device is not performed so as to determine when a diode is conducting current, the diode being located across a switch being monitored for a zero voltage state, wherein the diode conducting current indicates that the switch is at the zero voltage state (602). In some examples, DESAT_pin may be compared to 6Vref.

In some examples, a switch may be turned on based on the comparison of the first input voltage to the first reference voltage during the period of time when monitoring for the overcurrent of the input/output pin of the electronic device is not performed. The switch may be turned on when a diode across a switch is conducting. If the diode across the switch may be conducting then the voltage across the switch is low, e.g., 0.7 volts. This may be considered zero in this application with respect to ZVS. Accordingly, the switch may be turned on when the diode across a switch is conducting.

Low side driver circuitry 300 monitors an enable signal on the switch to determine a period of time when monitoring for the overcurrent of the input/output pin of the electronic device is performed (604).

A comparison circuit, such as a comparison circuit including an operational amplifier 306 compares a second input voltage to a second reference voltage during the period of time when monitoring for the overcurrent of the input/output pin of the electronic device is performed to determine when an overcurrent of the input/output pin of the electronic device is occurring (606). It will be understood that the first input voltage and the second input voltage may be from separate inputs and may be connected to separate comparison circuits.

However, in some examples, the first input voltage and the second input voltage may be the voltage on a single pin at two different times, e.g., the DESAT_pin. Additionally, the first reference voltage and the second reference voltage may be two separate voltage references. These two separate voltage references may have the same or different voltages. However, the first reference voltage and the second reference voltage may be a single voltage reference, e.g., Vref.

Various examples have been described. These and other examples are within the scope of the following claims.

What is claimed is:

1. A method of monitoring overcurrent and zero voltage comprising:

monitoring an input/output pin of an electronic device to determine a period of time when monitoring for an overcurrent of the input/output pin of the electronic device is not performed; and comparing a first input voltage at the input/output pin of the electronic device to a first reference voltage during the period of time when monitoring for the overcurrent of the input/output pin of the electronic device is not performed so as to determine when a diode in parallel with a switch is conducting current, the diode being external to the switch and the switch being monitored for a zero voltage state, wherein the diode conducting current indicates that the switch is at the zero voltage state.

2. The method of claim 1, further comprising:

monitoring an enable signal on the switch to determine a period of time when monitoring for the overcurrent of the input/output pin of the electronic device is performed; and comparing a second input voltage to a second reference voltage during the period of time when monitoring for the overcurrent of the input/output pin of the electronic device is performed to determine when an overcurrent of the input/output pin of the electronic device is occurring.

3. The method of claim 2, further comprising disabling the input/output pin of the electronic device when an overcurrent of the input/output pin is occurring.

4. The method of claim 2, wherein the first comparing step and the second comparing step are performed using a single comparator.

5. The method of claim 4, wherein the first reference voltage and the second reference voltage comprise a single reference voltage and the first comparing step and the second comparing step each comprise performing a compare of the input/output pin to the single reference voltage.

6. The method of claim 4, wherein monitoring the output of the modulator to determine the period of time when monitoring for the overcurrent of the input/output pin of the electronic device is not performed comprises monitoring an LI output of the modulator.

7. The method of claim 4, wherein monitoring an enable signal on the switch to determine the period of time when monitoring for the overcurrent of the input/output pin of the electronic device is performed comprises monitoring an LO output.

8. The method of claim 1, further comprising turning on the switch based on the comparison of the first input voltage to the first reference voltage during the period of time when monitoring for the overcurrent of the input/output pin of the electronic device is not performed so as to determine when the diode across the switch is conducting.

9. The method of claim 8, wherein turning the switch on occurs when the diode across a switch is conducting.

10. The method of claim 1, further comprising determining when the switch should be turned off and turning the switch off at that time.

11. An electronic device comprising:

circuitry for monitoring an input/output pin of an electronic device to determine a period of time when monitoring for an overcurrent of the input/output pin of the electronic device is not performed; and a first comparator configured to compare a first input voltage at the input/output pin of the electronic device to a first reference voltage during the period of time when monitoring for the overcurrent of the input/output pin of the electronic device is not performed so as to determine when a diode in parallel with a switch is conducting, the diode being external to the switch and the switch being monitored for a zero voltage state, wherein the diode conducting current indicates that the switch is at the zero voltage state.

12. The electronic device of claim 11, further comprising:

circuitry for monitoring an enable signal on the switch to determine a period of time when monitoring for the overcurrent of the input/output pin of the electronic device is performed; and a second comparator configured to compare a second input voltage to a second reference voltage during the period of time when monitoring for the overcurrent of the input/output pin of the electronic device is performed to determine when an overcurrent of the input/output pin of the electronic device is occurring.

13. The electronic device of claim 12, wherein the circuitry for monitoring an enable signal on the switch to determine a period of time when monitoring for the overcurrent of the input/output pin of the electronic device is performed is further configured to disable the input/output pin of the electronic device when an overcurrent of the input/output pin is occurring.

14. The electronic device of claim 12, wherein the first comparator and the second comparator comprise a single comparator.

15. The electronic device of claim 14, wherein the first reference voltage and the second reference voltage comprise a single reference voltage and the single comparator compares the input/output pin to the single reference voltage.

16. The electronic device of claim 14, wherein the circuitry for monitoring the output of the modulator to determine the period of time when monitoring for the overcurrent of the input/output pin of the electronic device is not performed comprises circuitry that monitors an LI output of the modulator.

17. The electronic device of claim 14, wherein the circuitry for monitoring an enable signal on the switch to determine the period of time when monitoring for the overcurrent of the input/output pin of the electronic device is performed comprises circuitry that monitors an LO output.

18. An electronic device comprising:

means for monitoring an input/output pin of an electronic device to determine a period of time when monitoring for an overcurrent of the input/output pin of the electronic device is not performed; and means for comparing a first input voltage at the input/output pin of the electronic device to a first reference voltage during the period of time when monitoring for the overcurrent of the input/output pin of the electronic device is not performed so as to determine when a diode in parallel with a switch is conducting current, the diode being external to the switch and the switch being monitored for a zero voltage state, wherein the diode conducting current indicates that the switch is at the zero voltage state.

19. The method of claim 18, further comprising:

means for monitoring an enable signal on the switch to determine a period of time when monitoring for the overcurrent of the input/output pin of the electronic device is performed; and means for comparing a second input voltage to a second reference voltage during the period of time when monitoring for the overcurrent of the input/output pin of the electronic device is performed to determine when an overcurrent of the input/output pin of the electronic device is occurring.

20. The method of claim 18, wherein the means for comparing the first input voltage to the first reference voltage and the means for comparing the second input voltage to the second reference voltage comprises a single comparison circuit.

* * * * *